Oct. 15, 1946.   R. H. ANDRESEN   2,409,464
LATHE ATTACHMENT
Filed Jan. 29, 1945   3 Sheets-Sheet 2

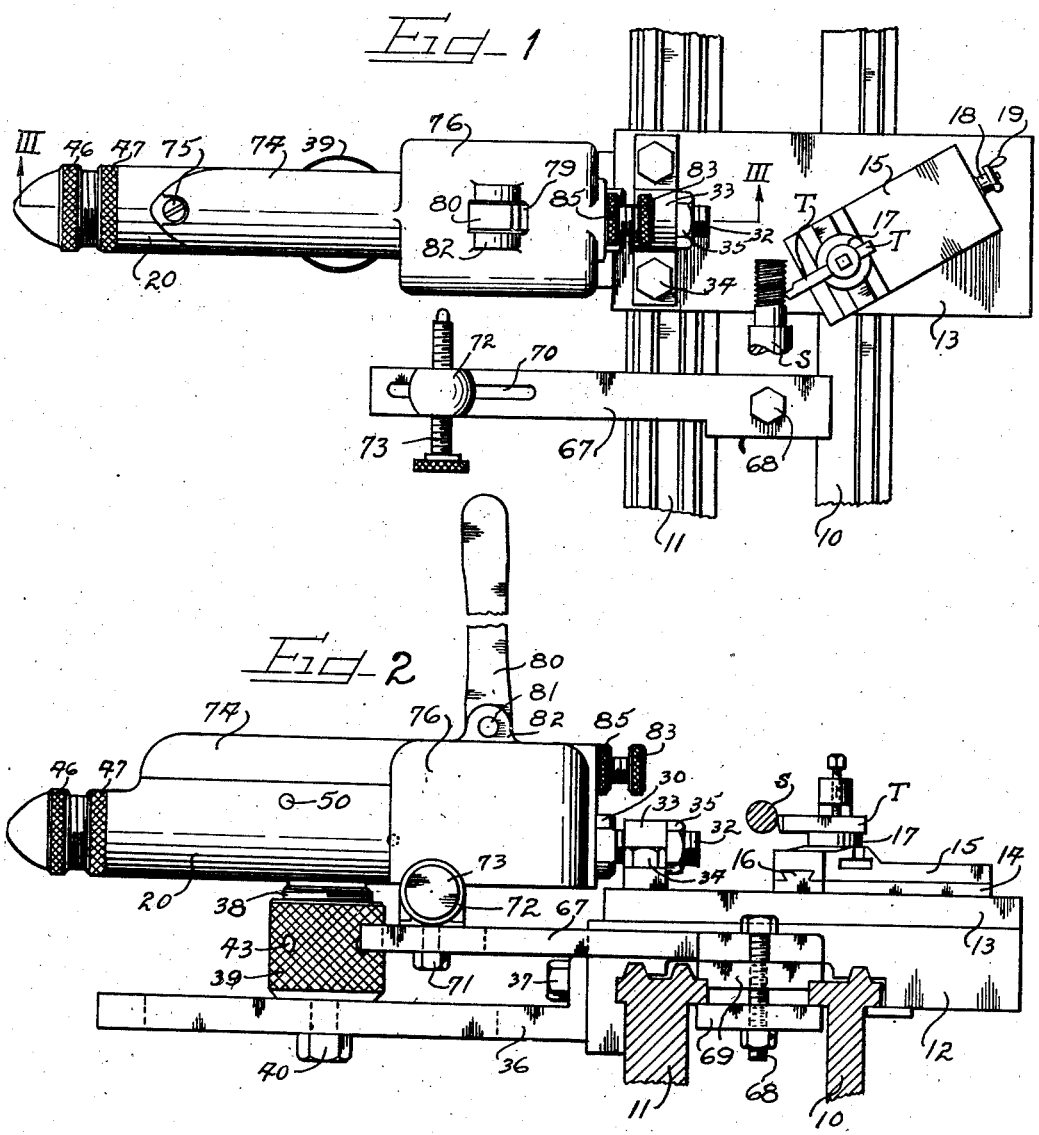

Inventor
Raymond H. Andresen
by The Firm of Charles W. Hill
Attys

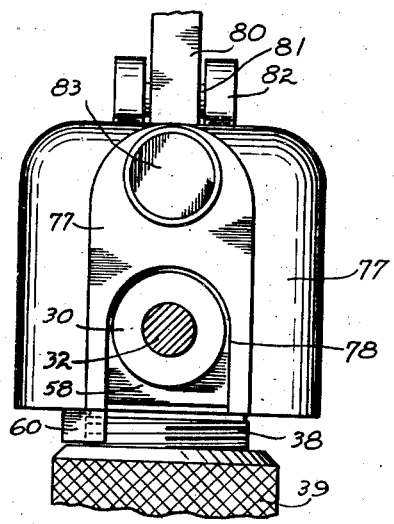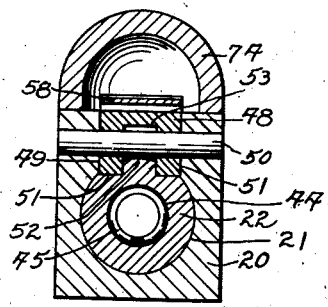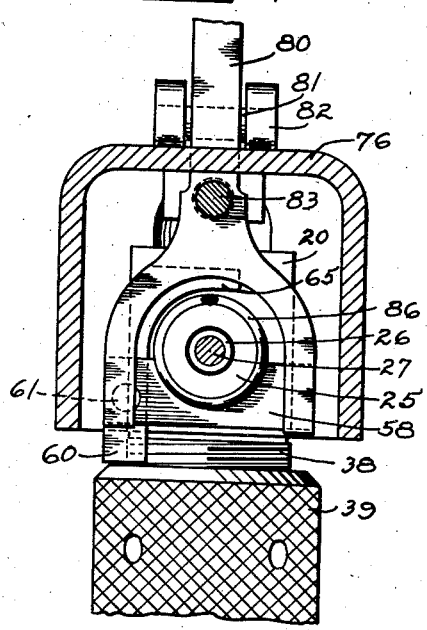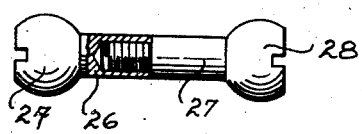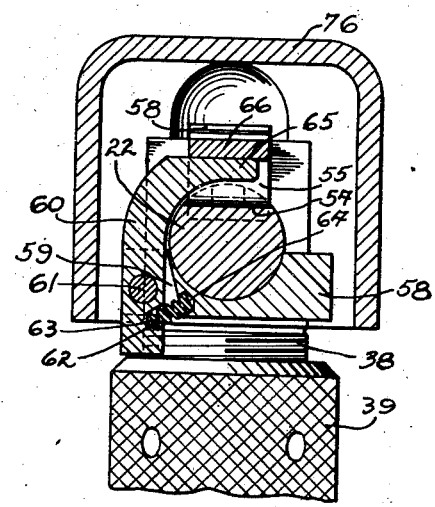

Patented Oct. 15, 1946

2,409,464

UNITED STATES PATENT OFFICE 2,409,464

LATHE ATTACHMENT

Raymond H. Andresen, Chicago, Ill., assignor to Peerless Tool and Engineering Company, Chicago, Ill., a corporation of Illinois Application January 29, 1945, Serial No. 575,091

9 Claims. (Cl. 82—5)

This invention relates to a lathe attachment and more particularly to an attachment or accessory in the form of an automatic tool retracting structure for retracting or withdrawing a tool from the work at the end of a cutting operation of the tool as, for example, in the cutting of threads.

The important object of the invention is to provide an attachment in the form of a compact unitary assembly readily applied in service position on machines, such as lathes, without requiring any alteration on the machine.

The various features of my invention and advantages will become apparent from the following specification taken in connection with the drawings, in which drawings Figure 1 is a plan view of the attachment applied to a lathe;

Figure 2 is a side elevation;

Figure 4 is a section on plane IV—IV, Figure 3;

Figure 5 is a section on plane V—V, Figure 3;

Figure 6 is a section on plane VI—VI, Figure 3;

Figure 7 is a section on plane VII—VII, Figure 3; and

Figure 8 is a side elevation of a coupling link used in the attachment.

Figure 3:
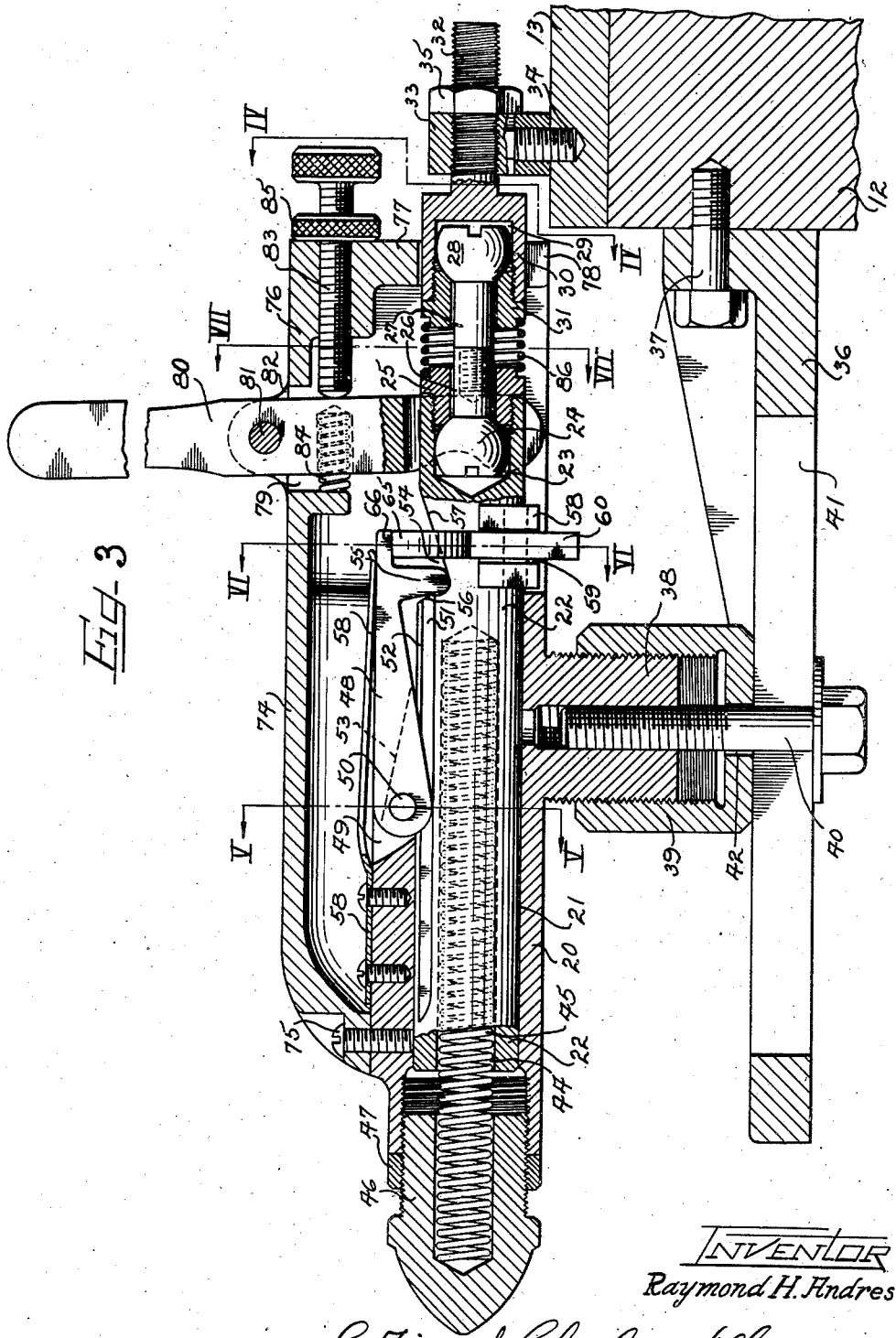
Figure 3 is an enlarged section on plane III—III, Figure 1.

On Figures 1 and 2 the slideways 10 and 11 forming part of the bed of a conventional lathe are shown, the lathe carriage 12 being mounted on the slideways for longitudinal travel thereon, the movement of the carriage being usually controlled by a lead screw, not shown, all in a manner well known in the art. Mounted on the carriage as by a dovetail connection (not shown) is the cross slide 13 movable on the carriage transversely of the slideways 10 and 11. The carriage and the cross slide thereon may be more or less conventional structure and are usually standard equipment with conventional lathes. In such conventional structure, manually operable means are provided for manually controlling the cross movement of the slide on the carriage. Adjustably mounted on the cross slide 13 is the base 14 of a tool supporting structure whose upper or plate part 15 has dovetail connection 16 with the base 14, and on the part 15 a holder 17 is adjustable for supporting a tool T. The longitudinal movement of the plate 15 on the base 14 is controlled by a lead screw 18 operable by a hand wheel 19.

My improved attachment comprises a body 20 which may be of rectangular cross section, as shown on Figure 5. A bore 21 extends through the body for receiving an actuating member in the form of a plunger 22 which at its inner end has the cylindrical axially extending recess 23 which forms a socket for the spherical head 24 of a coupling link. A bushing 25 threads into the end of the socket for holding the head 24 therein whose stem 26 extends outwardly through the bushing for threaded connection with the threaded end of the stem 27 extending inwardly from the sperical head 28. The head 28 is received in the recess 29 of the cylindrical socket member 30 and is retained therein by a bushing 31. The socket member 30 has a threaded stud 32 extending outwardly therefrom for threaded engagement in a bracket 33 detachably secured, as by screws 34, to the top of the cross slide 13 adjacent to the edge thereof. A lock nut 35 engages the stud 32 and the bracket to hold the bracket and therefore the cross slide 13 in adjusted position relative to the member 30.

Below the body 20 a supporting bracket or shelf 36 extends from the carriage 12 to which it is detachably secured as by screws 37. A threaded stud 38 extends from the body 20 near the inner end thereof and receives the cup shaped nut 39 which rests on the bracket 36 to hold the body in service position. By rotating the nut the body may be adjusted vertically in position for engagement of the threaded stud 32 with the bracket 33 on the slide chamber. After adjustment of the nut 35 the body is held in its adjusted position by a clamping screw 40 extending through a slot 41 in the bracket and through the opening 42 of the nut into threaded engagement with the stud 38, the slot 41 being elongated so that the body may be adjusted in longitudinal direction on the bracket. As shown on Figure 2, the nut may be provided with radial openings 43 for the insertion of a tool whereby the nut may be more readily turned. The double ball and socket connection between the socket end of the plunger 22 and the socket member 30 forms a universal joint or coupling so that, if after mounting and adjustment of the body 20 on the bracket 36 by setting of the screw 39, the axis of the plunger 22 is out of alignment with the axis of the stud 32, longitudinal movement of the plunger in the bore 21 will be communicated to the stud 32 and to the cross slide 13 without straining the connection between the socket member 30 and the cross slide.

The longitudinal movement of the plunger 22 controls the movement of the cross slide 13 and therefore the movement of the tool T in the tool holder relative to the work to be operated on. As shown on Figures 1 and 2, the work may be a screw S on which a thread is to be cut by the tool. When the plunger is in its inner position, as shown on Figures 1, 2 and 3, the tool will be held in cutting position against the screw for cutting of the thread, and when the plunger is shifted out, the cross slide together with the tool will be shifted to retract the tool from cutting engagement with the work. Referring to Figure 3, the plunger 22 has the bore 44 extending thereinto for receiving a compression spring 45 which projects from the outer end of the bore into the bore of a nut 46 threading into the end of the body 20 so that the spring may be primarily loaded to the desired degree, a lock nut 47 holding the adjusting nut 46 in set position. The loading of the spring will depend upon the weight of the cross slide 13 and the friction of movement thereof on the carriage and the weight carried by the cross slide. The attachment can thus be readily adapted for service on various types and sizes of lathes or other machines on which the attachment may be used.

Sufficient means are provided for holding the plunger 22 in its inner position for holding the cross slide 13 for cutting engagement of the tool with the work, and for releasing the plunger for outward movement thereof and of the cross slide for disengagement of the tool from the work at the end of a cut. A latch lever 48 extends in the slot 49 in the body 20 above the plunger 22 and is pivoted at its outer end to the body by a pin 50 which extends through the body and the slot. The cylindrical plunger 22 has on its upper side two longitudinally extending rectangular recesses 51 cut therein leaving therebetween the tongue 52 which is received in the longitudinal slot 53 cut in the underside of the lever 48 at its inner or fulcrum end, the lever thus functioning as a key to hold the plunger 22 against rotational movement in the bore 21.

Below the free end of the lever 48 the plunger 22 is cut transversely to provide a latch notch 54, and projecting downwardly from the latch lever is a latch tongue 55 for engagement in the latch notch. The lower portion of the notch 54 is substantially semi-circular to receive the substantially semi-cylindrical lower end of the latch lever tongue 55 when the latch lever is in latching position in the notch. The notch surface 56 rearwardly of the tongue 55 inclines rearwardly rather abruptly from the semi-circular bottom of the notch while the notch surface 57 outwardly of the semi-circular bottom inclines less abruptly, as shown on Figure 3. A leaf spring 58 is anchored on the body 20 with its outer end extending along the top of the latch lever for engagement against the outer end of the latch lever and tends to hold the lever swung against the plunger for engagement of its tongue 55 in the latch notch 54. When the plunger 24 is shifted to its inner position, shown on Figure 3, and the notch 54 is brought into position below the latch tongue 55, the spring will swing the lever down with the semi-cylindrical end of the latch tongue into the semi-circular bottom of the notch to hold the plunger in its inner position against the pressure of the spring 45, so that for this latched position of the plunger the cross slide 13 will be held for cutting engagement of the tool T with the work.

Trigger mechanism is provided to be operated at the proper time for releasing the latch lever from the plunger so that the plunger may be shifted out by the spring 45 for corresponding shift of the cross slide 13 and the tool holder structure for retraction or withdrawal of the tool from the work. This trigger mechanism is best shown on Figures 1, 3 and 7. A cross bar 58 is secured, as by welding, against the underside of the plunger below the latch notch 54. One end of the bar 58 has the slot 59 therein through which the vertical leg of an L-shape trigger 60 extends to receive the fulcrum pin 61 for fulcruming the trigger on the bar. A spring 62 is received at one end in a pocket 63 in the lower end of the trigger and at its other end is received in a pocket 64 in the bar 58 adjacent to the lower end of the slot 59, the spring normally holding the trigger against the bar at the upper end of the slot 59 with its upper leg 65 extending horizontally above the plunger 22 and below the end 66 of the latch lever 48 outwardly from the latch tongue 55, as best shown on Figures 3 and 6.

As shown on Figures 1 and 2, a stop bar 67 extends outwardly from the lathe rails 10 and 11, the bar being supported in desired position by a bolt 68 extending through the bar and through clamping plates 69 clamped to the rails 10 and 11 by the bolt. At its outer end the bar 67 has the longitudinally extending slot 70 through which a screw 71 passes for holding a support 72 on the bar, which support is threaded for receiving a stop screw 73. In the arrangement shown on Figures 1 and 2, the carriage 12 moves toward the work S which in practice is supported between head and tail stocks of the lathe or is supported by a chuck for rotation and for engagement of the tool T therewith. The stop pin 73 is positioned for engagement by the outer side of the lower end of the trigger 60 when the tool reaches the end of a cut, at which point the tool is to be retracted from the work. As shown on Figure 1, the tool is to be retracted from the screw when the end of a thread cut is reached. When the end of the trigger contacts the end of the stop pin 33, the trigger will be swung in counter-clockwise direction, Figure 6, so that its horizontal leg 65, by its engagement with the end 66 of the latch lever, will raise the latch lever far enough to carry the semi-cylindrical end of the latch tongue 55 out of the semi-circular bottom of the latch notch 54 for unlatching and release of the plunger which will then be shifted out by the spring 45 for corresponding shift of the cross slide 13 and tool holder for disengagement of the tool from the work. The spring 58 will resist the unlatching movement of the latch lever and after the plunger has been released for outward movement by the spring 48 after the latch lever tongue 55 has been moved out of the semi-circular bottom of the notch 54, the end of the tongue 55 will be yieldingly held by the spring against the inclined surface 56 of the notch 54 and the outward movement of the plunger will be retarded so that the tool will not be abruptly withdrawn from the work but the withdrawal will be gradual so that, where a thread is to be cut up to a certain point on work such as a screw, the end of the thread will be tapering and not abrupt.

After the tool has been thus automatically withdrawn from the work, the carriage is moved for the next cut of the threading, and means are therefore provided for shifting the plunger back into latching engagement by the latch lever to bring the tool up to the work for the next cut of the threading. Mounted on the body 20 is a cover 74 secured thereto as by screws 75, the outer portion of the cover over the body being of semi-circular cross-section, as shown on Figure 5, the inner portion 76 of the cover being expanded to form a rectangular housing for receiving the coupling connection between the plunger and the stud 32, the end wall 77 of the housing having the passageway 78 through which the socket member 30 of the coupling extends. In the top of the housing part 76 is an opening 79 through which extends the lever 80 which is fulcrumed on a pin 81 supported in ears 82 extending upwardly adjacent to the opening 79. As shown on Figure 7, the inner end of the lever 80 is bifurcated to straddle the socket end of the plunger 22. A stop screw 83 extends through the end wall 77, the lever 80 below the fulcrum pin 81 being held against the inner end of the stop screw by a spring 84, the lower bifurcated end of the lever being normally held away from the bar 58 on which the trigger 60 is mounted, as shown on Figure 3, the plunger being at this time in latched position for holding of the tool against the work. When the end of a cut by the tool is reached and the trigger encounters the stop pin 73, and the plunger is unlatched, it will be shifted out by the spring 45 until the ends of the bar 58 engage the bifurcated ends of the lever 80, such engagement determining the distance that the tool will be withdrawn from the work. This distance may be adjusted by setting of the stop screw 83 which, after setting, will be held in set position by a lock nut 85. When the carriage is now moved back for another cut on the work by the tool, the lever 80 is swung for shifting the plunger back for shift of the cross slide 13 and setting of the tool for the next cut, and during such back shift or retraction of the plunger the latch notch 54 will be brought under the tongue 55 of the latch lever 48 for relatching of the plunger, and the trigger will be brought back into position below the end 66 of the latch lever.

As shown on Figure 3, a compression spring 86 is interposed between the socket bushings 25 and 31 of the universal coupling structure for holding the bushings against the coupling heads 25 and 28 and to prevent back-lash of the cross slide 13 and the tool support when the plunger 22 is retracted by the lever 80 for bringing the tool into cutting position. The spring 86 also transmits the outward movement of the plunger 22 to the socket member 30 and stud 32 and to the cross slide 13 for retraction of the tool from the work at the end of a cut.

Frequently, the tool may become dulled before a cut on the work is finished and will require sharpening before finishing the cut. Under these conditions, the lock nut 35 on the stud 32 is released and the socket head 30 of the universal coupling is turned for turning of the threaded stud 32 in the threaded bracket 33 for shift of the cross slide 13 and the tool holder for withdrawal of the tool cutting end from the thread so that the tool may be sharpened. The socket member 30 is then turned to bring the cross slide 13 back for engagement of the tool point into the thread on the work and the lock nut 35 is then set, and cutting of the work will then continue with the sharpened tool until the end of the cut is reached and the trigger is operated for unlatching of the plunger and withdrawal of the tool from the work at the end of the cut.

I have thus provided an automatic tool withdrawing attachment in the form of a simple and compact assembly which may be readily applied on lathes or other machines of various types and sizes. I do not desire to be limited to the exact construction, arrangement and operation shown and described as changes and modifications may be made without departing from the scope of the invention as defined in the appended claims.

I claim as my invention:

1. An attachment for application to the carriage and tool supporting cross slide of a lathe, comprising a frame and means for supporting it rigidly from the lathe carriage to be moved therewith when the lathe is operated, an actuating member movable in said frame and adapted for connection with the cross slide of the lathe, spring means tending to shift said actuating member for shift of the tool slide to retract the tool thereon from work in the lathe, means providing a latch interconnection between said frame and said actuating member for normally holding said actuating member with the cross slide in position for application of the tool to the work, a trigger on said actuating member for said latching connection, a stop adapted to be applied on the lathe bed for engagement by the trigger for release of the latching connection and movement of said actuating member and cross slide by said spring means for retraction of the tool from the work when the tool has reached a predetermined position in the cutting operation, and a lever on said frame forming a stop for limiting the shift of said actuating member and cross slide by said spring means and operable to shift said actuating member back into normal latched position.

2. A lathe attachment for application to a lathe carriage and the work supporting cross slide thereon for effecting withdrawal of a tool from work in the lathe when the tool has reached a predetermined point in its operation on the work, said attachment comprising a supporting bracket to be secured to the lathe carriage, a frame adjustably mounted on said supporting bracket, an actuating member movable in said frame, a universal coupling connecting said actuating member with the cross slide of the lathe, spring means tending to shift said actuating member and the cross slide for retraction of the tool from the work, latching means normally holding said actuating member against the force of said spring means to hold the cross slide in position for engagement of the tool with the work, trigger means for releasing the latching means, means providing a stop on the lathe bed for engagement by the trigger for release of the latching means and shift of the actuating member and cross slide for withdrawal of the tool from the work when the predetermined point in the operation of the tool is reached.

3. A lathe attachment for application to the carriage of a lathe and a tool supporting cross slide thereon for automatically withdrawing the tool from the work when a predetermined position has been reached in the cutting operation by the tool, said attachment comprising a frame, a support for said frame attachable to the lathe carriage, an actuating member movable in said frame, a connection between said actuating member and the cross slide including a double ball and socket joint through which movement of the actuating member is transmitted to the cross slide, spring means tending to shift said actuating member outwardly in said frame for movement of the cross slide for withdrawal of the tool from the work, holding means normally holding said actuating member in its inner position in said frame for holding the tool in cutting engagement with the work, and stop means for mounting on the lathe bed with which said holding means engages to be moved for release of said actuating member for outward shift thereof by said spring means and withdrawal of the tool from the work when the tool has reached the predetermined position in the cutting operation.

4. A lathe attachment for application to a lathe carriage and the tool supporting cross slide thereon for automatically withdrawing the tool from the work when the tool has reached a predetermined position in the cutting operation, said attachment comprising a frame and means for rigidly supporting it from the lathe carriage, a plunger shiftable in said body and connected with the cross slide of the lathe, spring means in said frame tending to shift said plunger outwardly for movement of the cross slide for withdrawal of the tool from the work, said plunger having a latch notch therein, a latch lever on said frame engageable in said latch notch for normally holding said plunger in its inner position against the force of said spring for holding the cross slide for application of the tool to the work, a trigger mounted on said plunger, and a stop member mounted on the lathe bed for engagement by the trigger when the tool has reached the predetermined position in the cutting operation for operation of the trigger to unlatch said plunger for outward movement thereof for withdrawal of the tool from the work.

5. In a lathe having a carriage with a tool supporting cross slide thereon, an attachment for controlling the shift of said cross slide for holding a tool in operating engagement with work in the lathe or for retraction of the tool from the work, said attachment comprising a frame supported from the carriage, a plunger movable inwardly and outwardly in said frame in a direction transversely of the carriage, a rotatable member at the outer end of said plunger movable therewith and having a threaded stud extending therefrom, a threaded bracket secured to the cross slide for receiving said stud whereby said slide will move with said plunger, latch means in said frame for latching engagement with said plunger to hold it in its inner position with the tool on the slide in cutting engagement with the work, spring means tending to shift the plunger outwardly, and releasing means automatically operable to release said latching means for outward shift of the plunger for shift of said cross slide for withdrawal of the tool from the work when the tool has reached a predetermined cutting position relative to the work.

6. In a lathe having longitudinally moving carriage and a transversely movable tool supporting cross slide thereon, an attachment for automatically effecting withdrawal of the tool from the work when the tool has reached a predetermined position, said attachment comprising a bracket secured to and extending laterally from one end of the carriage, a frame, means for adjusting said frame longitudinally and vertically relative to said support, means for locking the frame in adjusted position, a plunger shiftable longitudinally in said frame, a bracket secured on said cross slide adjacent one end thereof and having a threaded bore, a rotatable member secured to the outer end of said plunger by a universal coupling and having a threaded stud extending therefrom for engagement in the threaded bore of said bracket whereby said cross slide will be connected with said plunger for movement therewith, means for shifting said plunger into normal position in said frame for cutting application of the tool to the work, latching means in said frame for latching said plunger in its normal position, spring means tending to shift said plunger out of normal position for retraction of the tool from the work, and means operative when the tool has reached a predetermined position in its cutting operation on the work for automatically releasing the latching means for shift of the plunger for retraction of the tool from the work.

7. An attachment for application to a lathe carriage and the tool supporting cross slide thereon for automatically moving the cross slide for retraction of the tool from work in the lathe after the tool has reached a predetermined position in the cutting operation, comprising a body member attached to an end of the lathe carriage and extending outwardly from said end, an actuating member endwise movable in said body member in a direction at right angles to the length of the lathe, means connecting said actuating member to the cross slide adjacent the end thereof which is on the other side of the work from the tool support, spring means within said body member tending to shift said actuating member for movement of the cross slide for withdrawal of a tool thereon from work in the lathe, a latch member in said body member having latching engagement with said actuating member for normally restraining said actuating member against movement by said spring means whereby to hold said cross slide for engagement of a tool thereon with the work, release means carried by said actuating member for unlatching said latch member, and stop means on the lathe frame for engagement by said release means for unlatching the latch means to enable movement of said actuating member by said spring means for moving the cross slide to withdraw the tool from the work when the tool has reached the predetermined position in the cutting operation of the work.

8. An attachment for application to the carriage and tool supporting cross slide of a lathe, comprising a body member and means for supporting it rigidly from the lathe carriage to be moved therewith when the lathe is operated, an actuating member movable in said body member and adapted for connection with the cross slide of the lathe, spring means acting directly against said actuating member and in axial alignment therewith tending to shift said actuating member for shift of the tool slide to retract the tool thereon from work in the lathe, a latch pivoted to said body member and engaging a notch in said actuating member for normally holding said actuating member with the cross slide in position for application of the tool to the work, a trigger on said actuating member for disabling said latching connection, and a stop adapted to be applied on the lathe bed for engagement by the trigger for release of the latching connection and movement of said actuating member and cross slide by said spring means for retraction of the tool from the work when the tool has reached a predetermined position in the cutting operation.

9. An attachment for application to the carriage and tool supporting cross slide of a lathe, comprising a body member and means for supporting it rigidly from the lathe carriage to be moved therewith when the lathe is operated, an actuating member endwise movable in said body member and adapted for connection with the cross slide of the lathe, spring means acting directly against said actuating member and in axial alignment therewith tending to shift said actuating member for shift of the tool slide to retract the tool thereon from work in the lathe, a latch pivoted to said body member and engageable with a notch in said actuating member for normally holding said actuating member with the cross slide in position for application of the tool to the work, a trigger on said actuating member for disabling said latching connection, a stop adapted to be applied to the lathe bed for engagement by the trigger for release of the latching connection and movement of said actuating member and cross slide by said spring means for retraction of the tool from the work when the tool has reached a predetermined position in the cutting operation, and means on said body member manually operable to shift said actuating member back into normal latched position for movement of the cross slide back into position for reapplication of the tool to the work for another cut.

RAYMOND H. ANDRESEN.